(12) United States Patent
Chapman et al.

(10) Patent No.: US 6,778,884 B2
(45) Date of Patent: Aug. 17, 2004

(54) SYSTEM AND METHOD FOR GENERATING CONSOLIDATED GAS TURBINE CONTROL TABLES

(75) Inventors: Gregory J. Chapman, Scottsdale, AZ (US); John J. Rushinsky, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 111 days.

(21) Appl. No.: 10/170,524

(22) Filed: Jun. 11, 2002

(65) Prior Publication Data

US 2003/0229427 A1 Dec. 11, 2003

(51) Int. Cl.⁷ .............................. B64C 1/00; G06F 7/00
(52) U.S. Cl. ............................ 701/3; 701/14; 244/194; 123/1 R; 60/597; 60/272
(58) Field of Search .............................. 701/3, 7, 8, 14; 244/194, 195, 1 R; 123/1 R; 60/597, 599, 272, 273, 721

(56) References Cited

U.S. PATENT DOCUMENTS

| | | | |
|---|---|---|---|
| 3,750,465 A | * | 8/1973 | Howell et al. .............. 73/117.3 |
| 4,487,016 A | | 12/1984 | Schwarz et al. |
| 4,594,666 A | | 6/1986 | Cornell |
| 4,815,294 A | | 3/1989 | David |
| 5,133,182 A | * | 7/1992 | Marcos ........................ 60/792 |
| 5,285,634 A | * | 2/1994 | Hoff et al. ................... 60/792 |
| 5,377,937 A | | 1/1995 | LaMay et al. |
| 5,574,647 A | | 11/1996 | Linden |
| 5,887,419 A | * | 3/1999 | Rowe et al. .................. 60/223 |
| 5,908,176 A | | 6/1999 | Gilyard |
| 6,311,106 B1 | | 10/2001 | Dupont |
| 6,314,343 B1 | | 11/2001 | Adams et al. |
| 6,341,247 B1 | | 1/2002 | Hreha et al. |

* cited by examiner

Primary Examiner—William A. Cuchlinski, Jr.
Assistant Examiner—Olga Hernandez
(74) Attorney, Agent, or Firm—Robert Desmond, Esq.

(57) ABSTRACT

A method for generating a power setting parameter table. The method includes the steps of generating an index from a plurality of first and second inputs and determining a power setting parameter corresponding to each index and second input. The first inputs may include flight speed and temperature values and the second inputs may include altitude values.

13 Claims, 10 Drawing Sheets

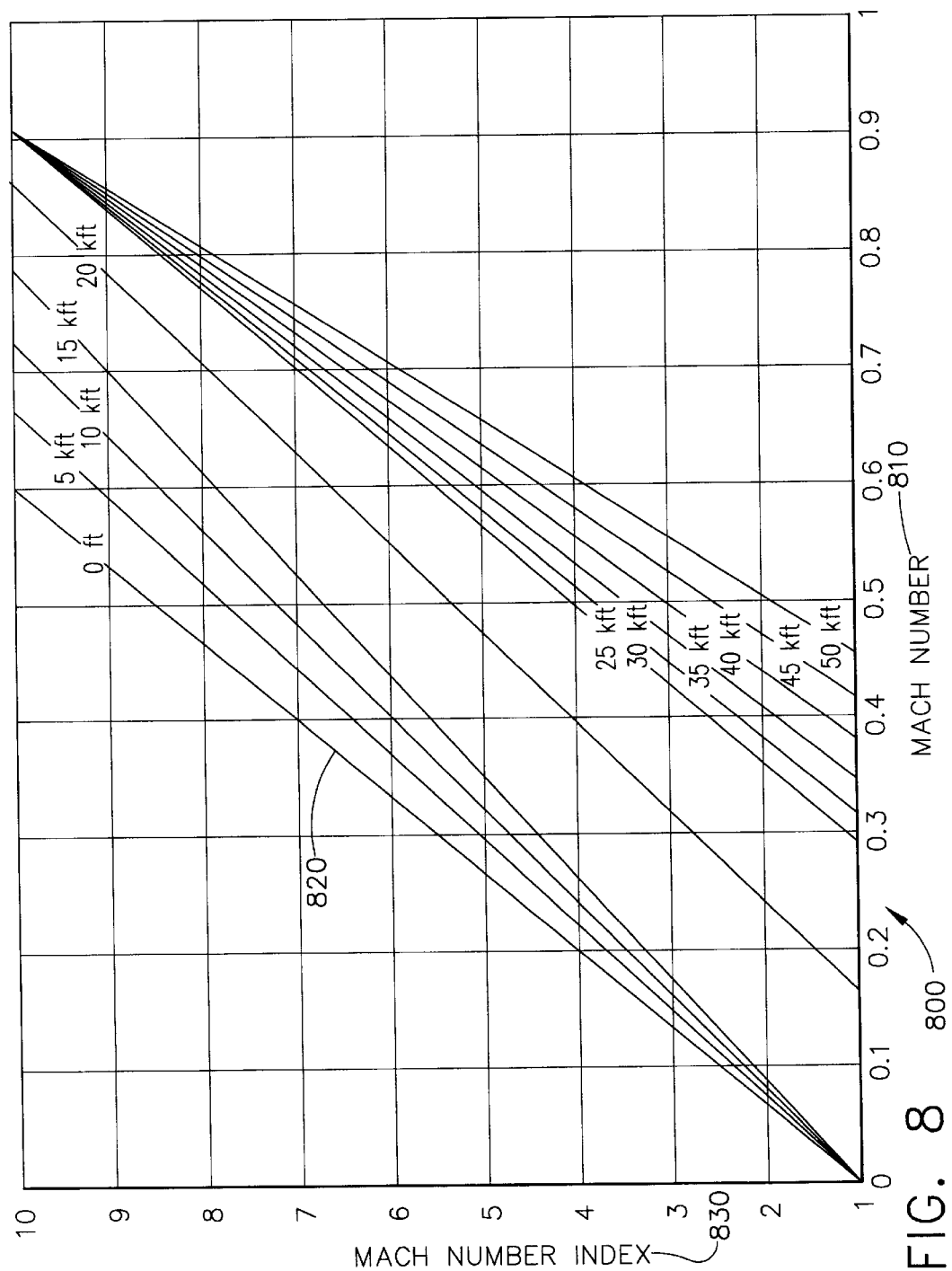

SYSTEM AND METHOD FOR GENERATING CONSOLIDATED GAS TURBINE CONTROL TABLES

BACKGROUND OF THE INVENTION

The present invention generally relates to electronic digital controls for gas turbine engines and, more particularly, to a system and method for generating consolidated gas turbine control tables for engine power setting.

Known electronic digital controls for gas turbine engines contain tables for engine power setting. As disclosed in U.S. Pat. No. 6,311,106 to Dupont, an embedded table in the engine control is used as part of the engine power setting adjustment for aircraft payload. From a total gross weight of the aircraft including the weight of loaded cargo containers, a required flat rate engine power for the aircraft is determined by inputting the total gross weight into a look-up table. The required flat rate engine power is sent as a command signal to the engine control system.

For aircraft engines, specifically turbofans, an engine power setting parameter (fan speed for example) may be scheduled as a function of variables such as altitude, flight speed and ambient temperature. The engine control interrogates the power setting table at a specific flight condition of interest and determines a power setting parameter set point. Engine fuel flow may then be modulated so that a measured engine parameter agrees with the set point value.

To minimize the power setting error for interpolated conditions, conventional power setting tables are densely populated. The tables typically cover all environmental conditions regardless of their probability of occurrence. For example, an engine power set point is required at sea level and static conditions. However, an engine power set point is not required at high altitudes, 50,000 feet for example, and static conditions as this condition is outside normal engine and aircraft flight envelopes. Nevertheless conventional power setting tables include an entry at high altitude and static conditions. Furthermore, typical power setting tables include large portions that contain data for flight conditions that may never be encountered.

Generating tabular power setting data for regions that are outside the normal engine operating envelope is particularly arduous, prone to error and impossible to verify. With reference to FIG. 1 and FIG. 2, there are shown operating envelopes generally designated 100 and 200 correlating flight speed and altitude and ambient temperature and altitude respectively. Data locations 110 and 210 show conditions where engine power setting parameters are generated. As can be seen, a substantial portion of the generated power setting parameters lie outside operating envelopes 100 and 200.

For each value of flight speed and ambient temperature used to generate a power setting parameter a corresponding location 110 and 210 exists for each altitude. Therefore, in order to provide adequate data density or fidelity at any one altitude, all other altitudes require defined data regardless of need which leads to large tables and memory requirements. However, memory allotted to engine controls is limited by considerations of power supply requirements, storage size, heat generation and cost. Consequently, tables such as those represented in FIG. 1 and FIG. 2 must be small and have reduced fidelity. The reduced fidelity can lead to undesirable thrust scheduling such as where the engine delivers slightly more thrust than required and consequently operates at elevated turbine temperatures. In turn, elevated turbine temperatures must be considered as part of engine design.

Data locations 110 and 210 located outside of operating envelopes 100 and 200 respectively can be extremely difficult to generate. Many of such data locations 110 and 210 can be beyond the tested and/or analytical predictions of the components that comprise the engine model. Engine models typically used in these regions often do not converge so that other extrapolation methods are used to generate the necessary data points. Typically, the extrapolation methods are purely mathematical and do not necessarily adhere to generally accepted laws of physics. Consequently, the extrapolated data has to be checked thoroughly to ensure that it does not introduce any anomalies near the operating envelopes 100 and 200.

With reference to FIG. 3 and FIG. 4, data locations 310 and 410 exist only within operating envelopes generally designated 300 and 400 respectively. A comparison of the number of data locations 310 to the number of data locations 110 and a comparison of the number of data locations 410 to the number of data locations 210 shows nearly a 60% reduction in tabulated data. However, the tables represented in FIG. 3 and FIG. 4 do not satisfy the engine control table lookup requirement of a flight speed and ambient temperature value for each altitude. This requirement is a result of the use of conventional table interpolation routines to generate power setting parameters.

A typical process for power setting parameter lookup is shown in FIG. 5. Values of altitude, flight speed and temperature are input to a process 500 which interrogates a table and generates a power setting parameter corresponding to the inputs.

As can be seen, there is a need for a system and method for generating consolidated gas turbine control tables that significantly reduces the amount of data required by the control table. Such a system and method preferably provides fidelity in the normal engine and aircraft operating envelopes. Further, such a system and method preferably only generates data required in the normal operating envelopes and thereby results in a reduced table size. Such a system and method also preferably provides for increased power setting parameter fidelity only where it is needed without unduly affecting operation of the engine far from the normal operating envelopes.

SUMMARY OF THE INVENTION

In one aspect of the present invention, a method for generating a power setting parameter table includes the steps of generating a non-dimensional index from a plurality of first and second inputs and determining a power setting parameter corresponding to each index and second input. The first inputs may include flight speed and temperature values and the second inputs may include altitude values.

In another aspect of the present invention, a system for generating a power setting parameter table includes a memory coupled to a processor, the processor operable to generate an index from a plurality of first and second inputs and determine a power setting parameter corresponding to each index and second input.

In yet another aspect of the present invention, a computer readable media for generating a power setting parameter table includes a code segment for generating an index from a plurality of first and second inputs and a code segment for determining a power setting parameter corresponding to each index and second input.

In a further aspect of the present invention, a method for generating a power setting parameter includes the steps of generating a first index from a plurality of first and second inputs, determining a first power setting parameter corresponding to each first index and second input to form a power setting parameter table, and interrogating the power setting table using the first index and the second input to generate the first power setting parameter.

These and other features, aspects and advantages of the present invention will become better understood with reference to the following drawings, description and claims.

BRIEF DESCRIPTION OF THE DRAWINGS

FIG. 8 is a graphical representation of a translation table in accordance with the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for generating a power setting parameter table. The method includes the steps of generating a non-dimensional index from a plurality of first and second inputs and determining a power setting parameter corresponding to each index and second input. The first inputs may include flight speed and temperature values and the second inputs may include altitude values. By providing a non-dimensional index into the power setting parameter table, the method of the present invention significantly reduces the amount of data required by the control table in comparison to that required by the prior art.

Figure 6:
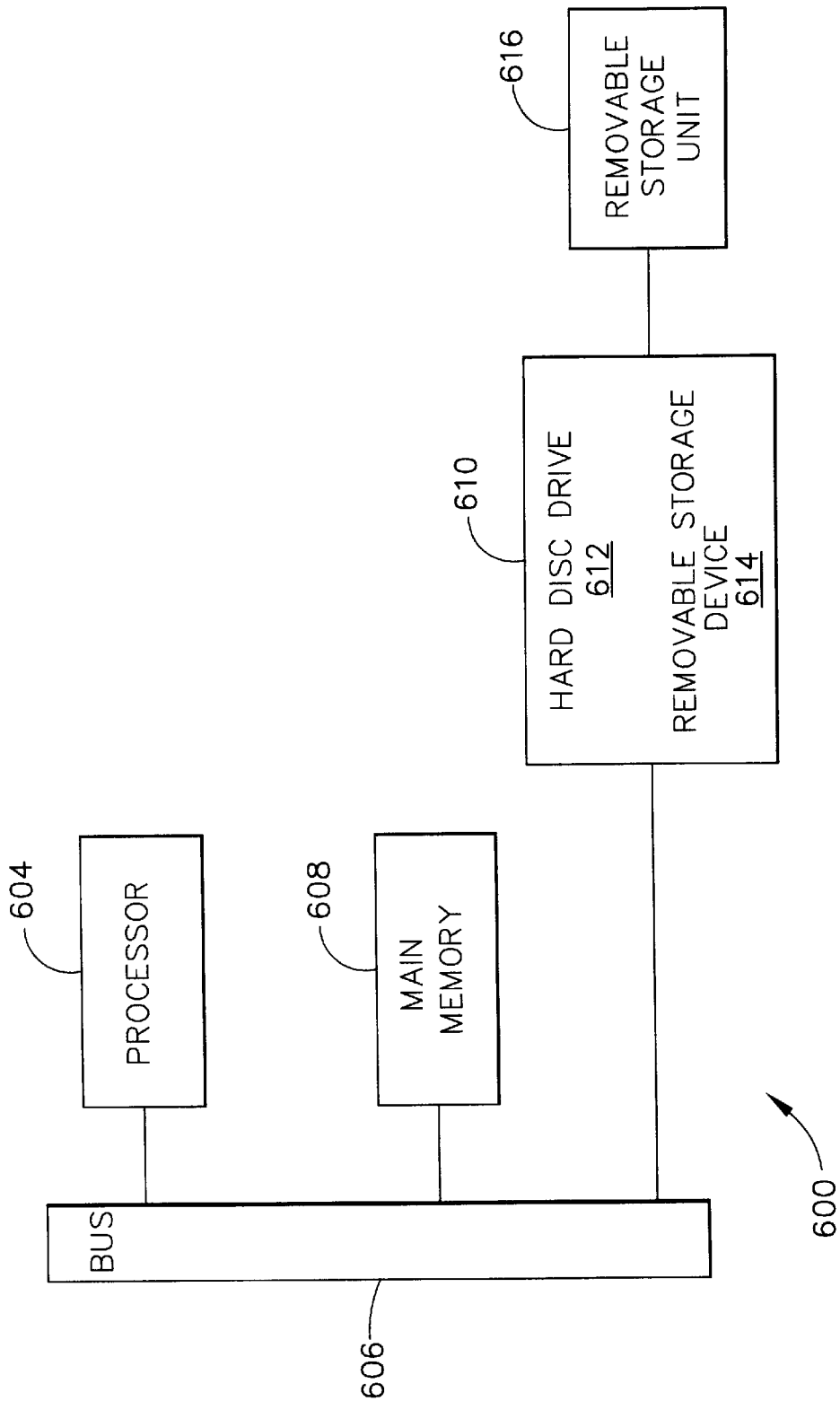
FIG. 6 is a schematic representation of computer system in accordance with the present invention.

One embodiment of the present invention includes computer software executing within a computer system. FIG. 6 shows an exemplary computer system generally designated 600. The computer system 600 may include one or more processors, such as processor 604 connected to a bus 606.

The computer system 600 also may include a main memory 608, preferably random access memory (RAM), and a secondary memory 610. The secondary memory 610 may include a hard disk drive 612 and a removable storage device 614, such as a floppy disk drive, a magnetic tape drive, and a compact disk drive. The removable storage drive 614 reads from and/or writes to a removable storage unit 616 in a manner well known in the art.

Removable storage unit 616, also called a program storage device or a computer program product, represents computer readable media which may include a floppy disk, magnet tape, and a compact disk. The removable storage unit 616 may include a computer usable storage medium having therein stored computer software and/or data.

Computer programs (also called computer control logic) may be stored in main memory 608 and/or secondary memory 610. Such computer programs, when executed, enable the computer system 600 to perform the functions of the present invention as further described herein. In particular, the computer programs, when executed, enable the processor 604 to perform the functions of the present invention. Accordingly, such computer programs represent controllers of the computer system 600.

Alternative embodiments of the present invention are directed to a computer program product comprising a computer readable medium having control logic (computer software) stored therein. The control logic, when executed by the processor 604, causes the processor 604 to perform the functions as further described herein.

Further embodiments of the present invention are implemented primarily in hardware using, for example, a hardware state machine (not shown). Implementation of the hardware state machine so as to perform the functions described herein will be apparent to persons skilled in the relevant arts.

Figure 7:
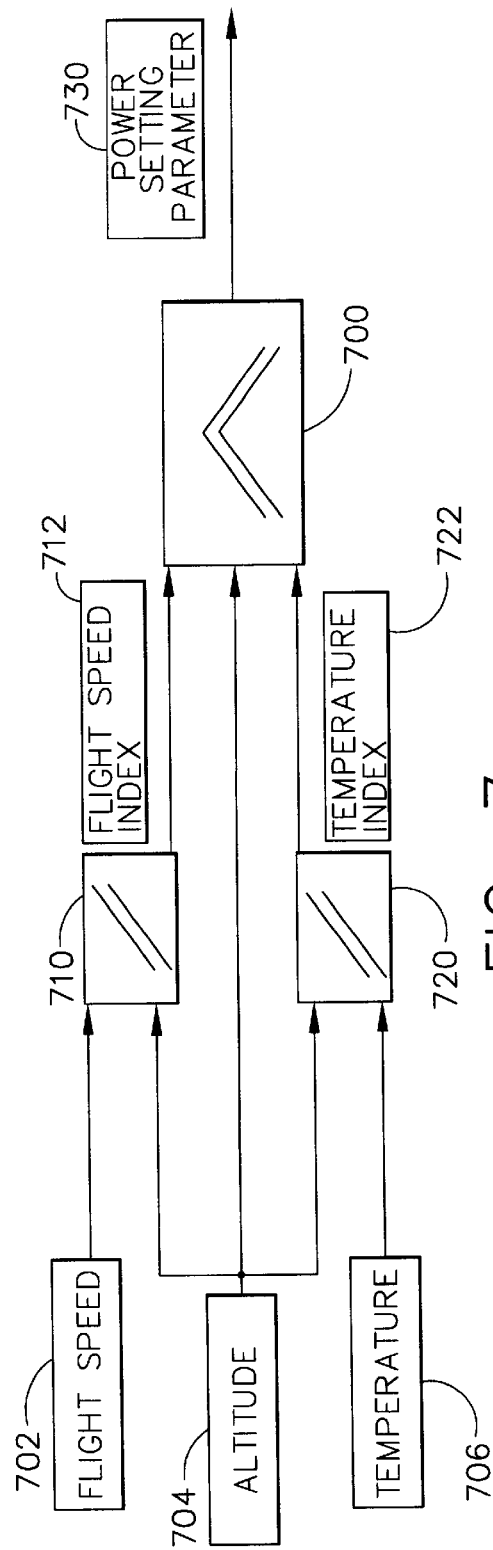
FIG. 7 is a schematic representation of a process in accordance with the present invention.

With reference to FIG. 7, an embodiment of the present invention includes a process 700 for generating power setting parameters. A flight speed index 712 may be generated by a process 710 having flight speed values 702 and altitude values 704 as inputs. A temperature index 722 may be generated by a process 720 having temperature values 706 and altitude values 704 as inputs. The flight speed and temperature indices 712 and 722, together with altitude 704, may be used by process 700 to interrogate a power setting parameter table constructed using the flight speed and temperature indices 712 and 722.

The flight speed and temperature indices 712 and 722 may be non-dimensional and may be generated through the use of translation tables as further described herein. As will be appreciated by those skilled in the art, the inputs to processes 710 and 720 can be other than those illustrated. Thus, for example, ambient pressure or total pressure can be substituted for altitude 704. Similarly, total temperature, ambient temperature, delta from standard day temperature can be substituted for the temperature input 706.

With reference to FIG. 8, a translation table generally designated 800 correlating flight speed 810, altitude 820 and flight speed index 830 is shown. The translation table 800 may be used by process 710. For a given flight speed 810 (Mach number) and altitude 820, the translation table 800 provides a flight speed index 830. As shown, a constant value of flight speed index 830 may not correspond to a constant flight speed 810. Furthermore, the flight speed range represented by flight speed indices 1 to 10 can vary with altitude 820. For example, at sea level, the flight speed indices from 1 to 10 represent flight speeds 810, represented by Mach numbers, from 0.0 to 0.6. However at 50000 feet altitude, the same flight speed index range represents Mach numbers from 0.45 to 0.91. This flexibility allows the power setting tables to be tailored to give high fidelity in particular regions of the operating envelopes without unduly influencing other regions in the same operating envelopes.

Figure 9:
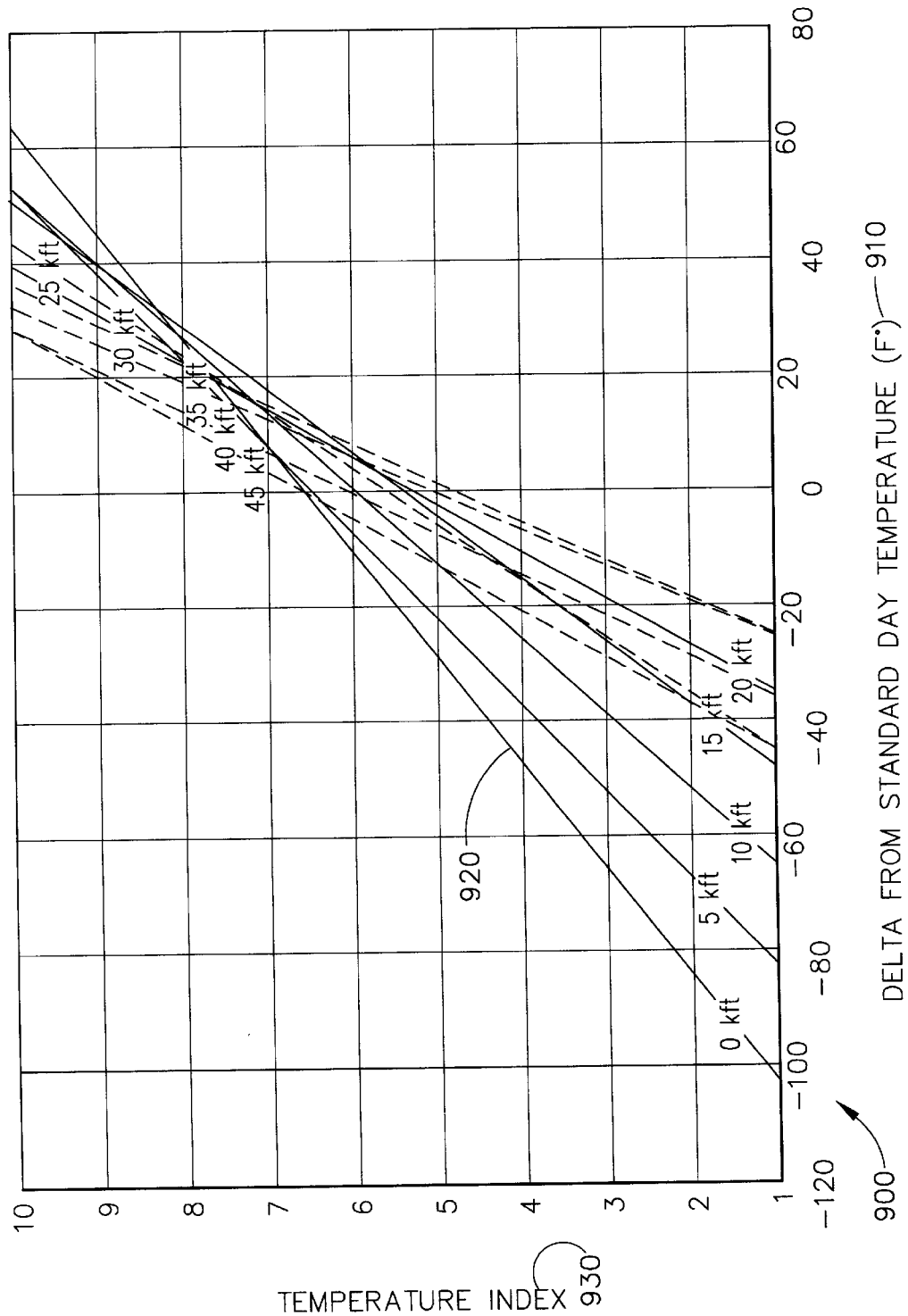
FIG. 9 is a graphical representation of another translation table in accordance with the present invention.

A translation table generally designated 900 correlating temperature 910, altitude 920 and temperature index 930 is shown in FIG. 9. The translation table 900 may be used by process 720. As shown, a constant value of temperature index 930 does not necessarily correspond to a constant temperature 910. Furthermore, the temperature range represented by the temperature indices 930 may vary with altitude 920.

The translation tables 800 and 900 depict linear relationships between the independent variables and the associated index. However, these relationships may not be linear and may be dictated by a need to increase data density in some regions of the power setting parameter table.

Figure 1:
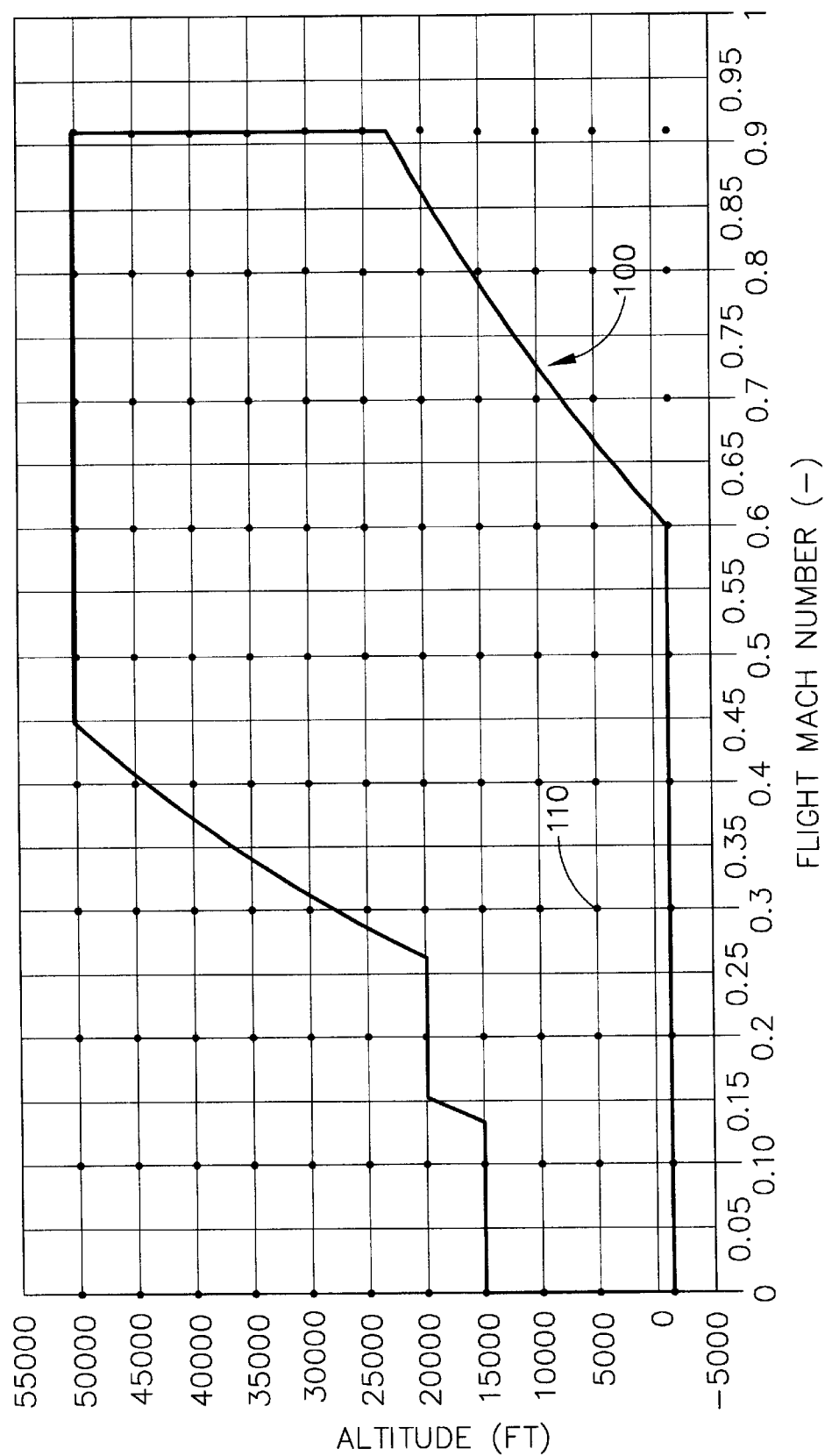
FIG. 1 is a graphical representation of a power setting parameter table of the prior art showing a first operating envelope.
Figure 2:
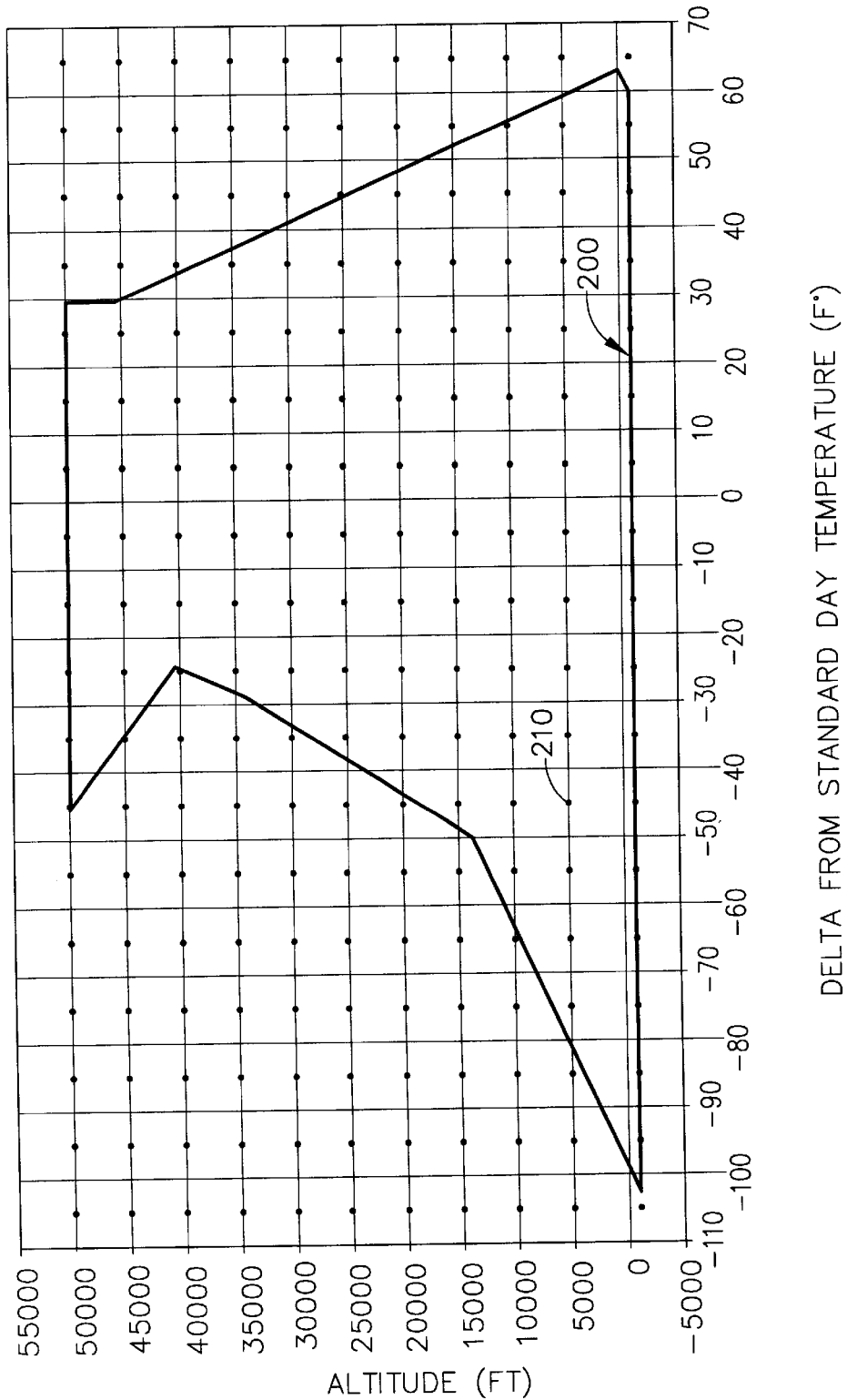
FIG. 2 is a graphical representation of a power setting parameter table of the prior art showing a second operating envelope.
Figure 3:
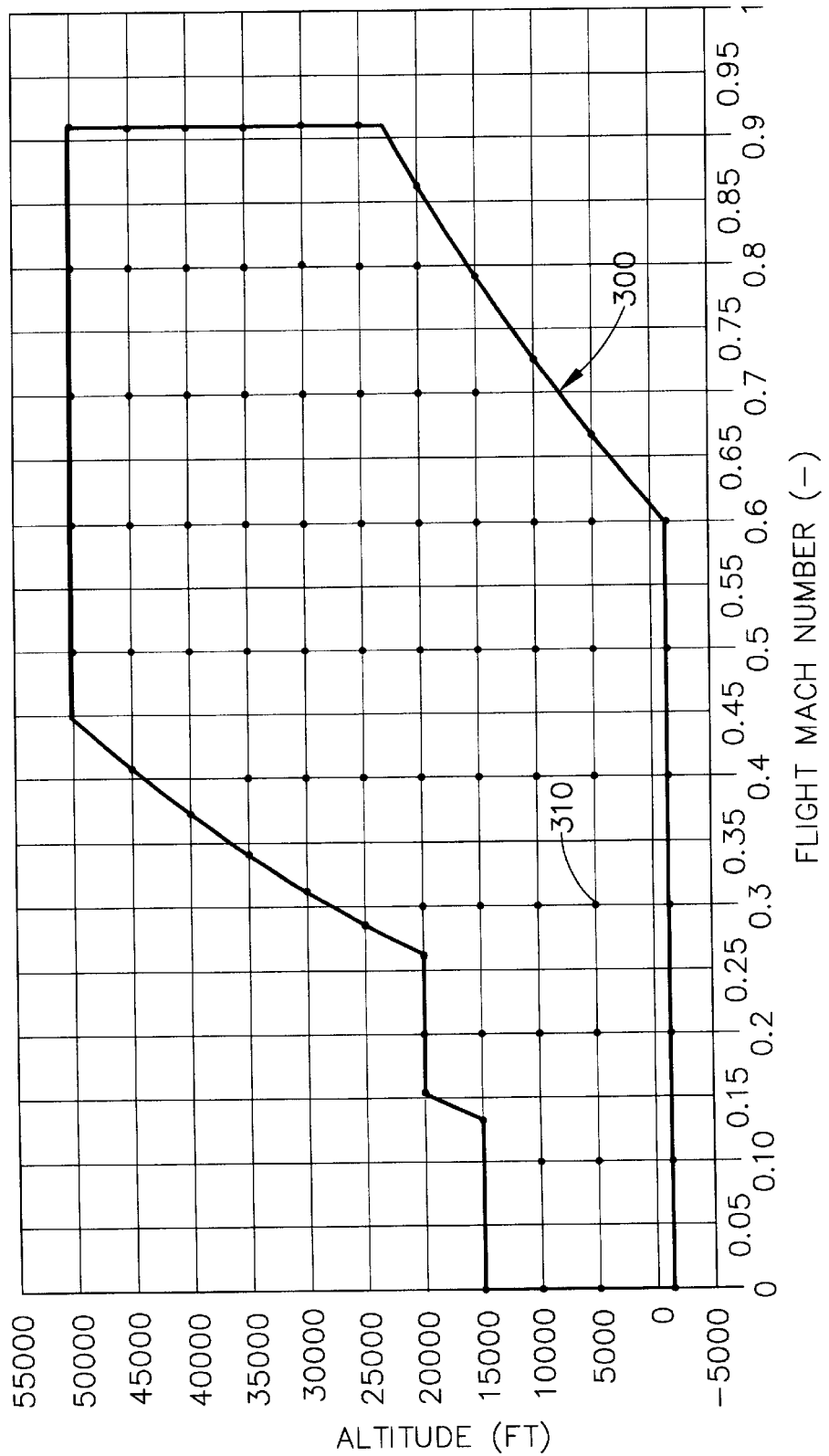
FIG. 3 further illustrates the first operating envelope.
Figure 4:
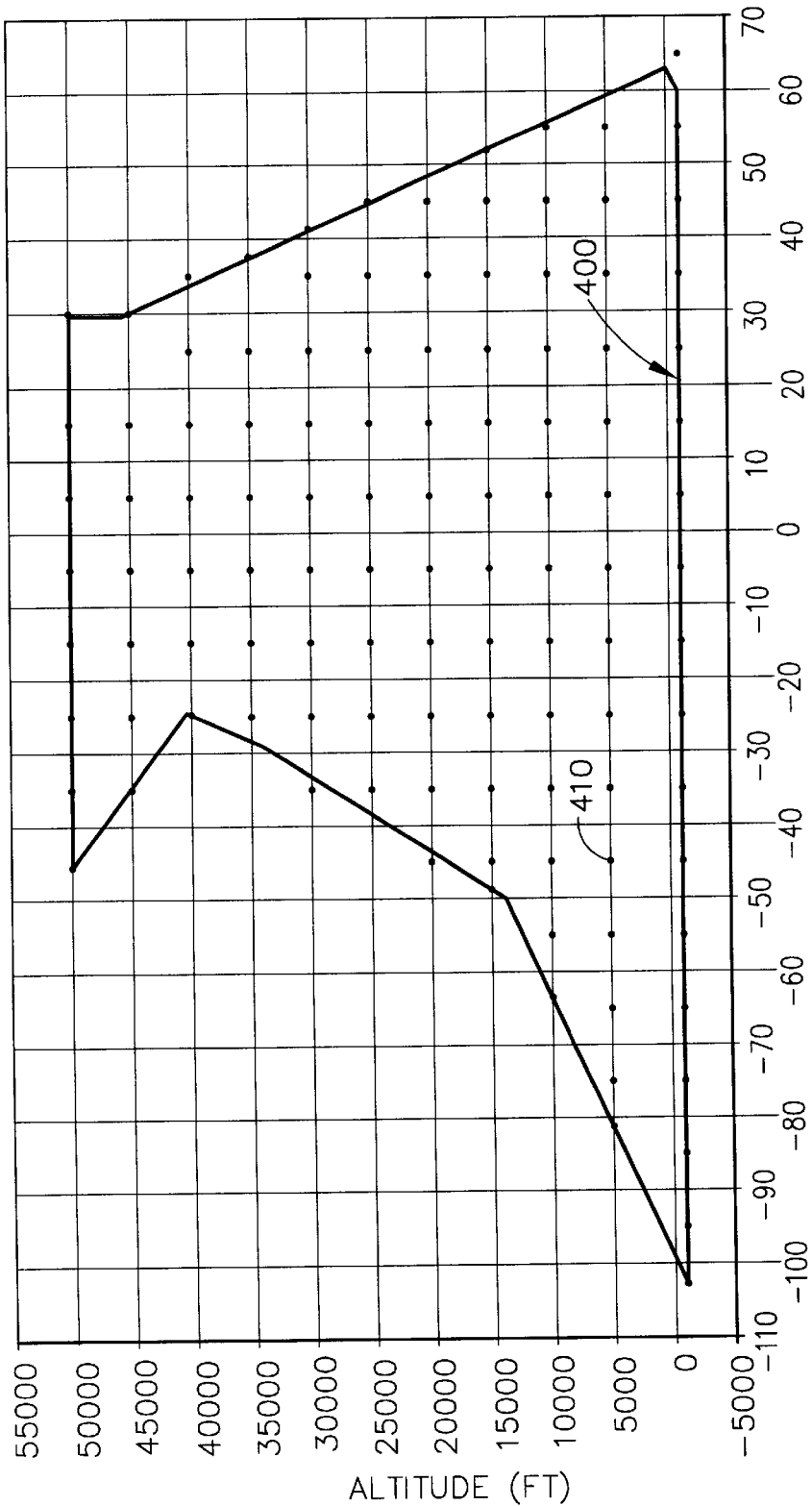
FIG. 4 further illustrates the second operating envelope.
Figure 5:
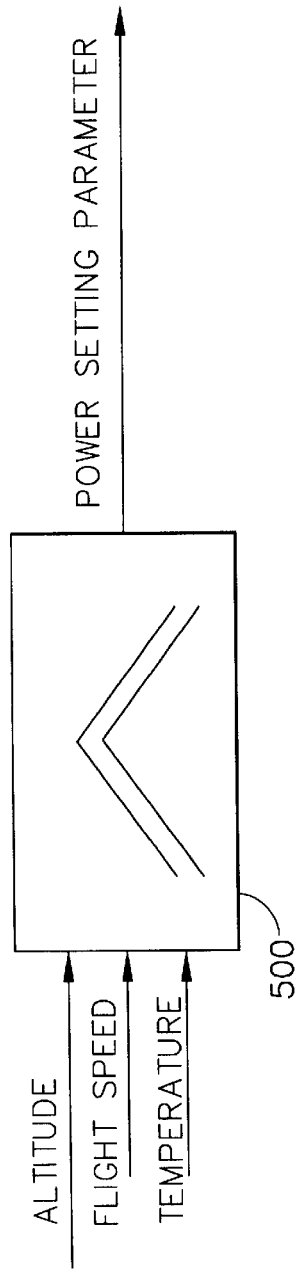
FIG. 5 is a schematic representation of a process of the prior art.
Figure 10:
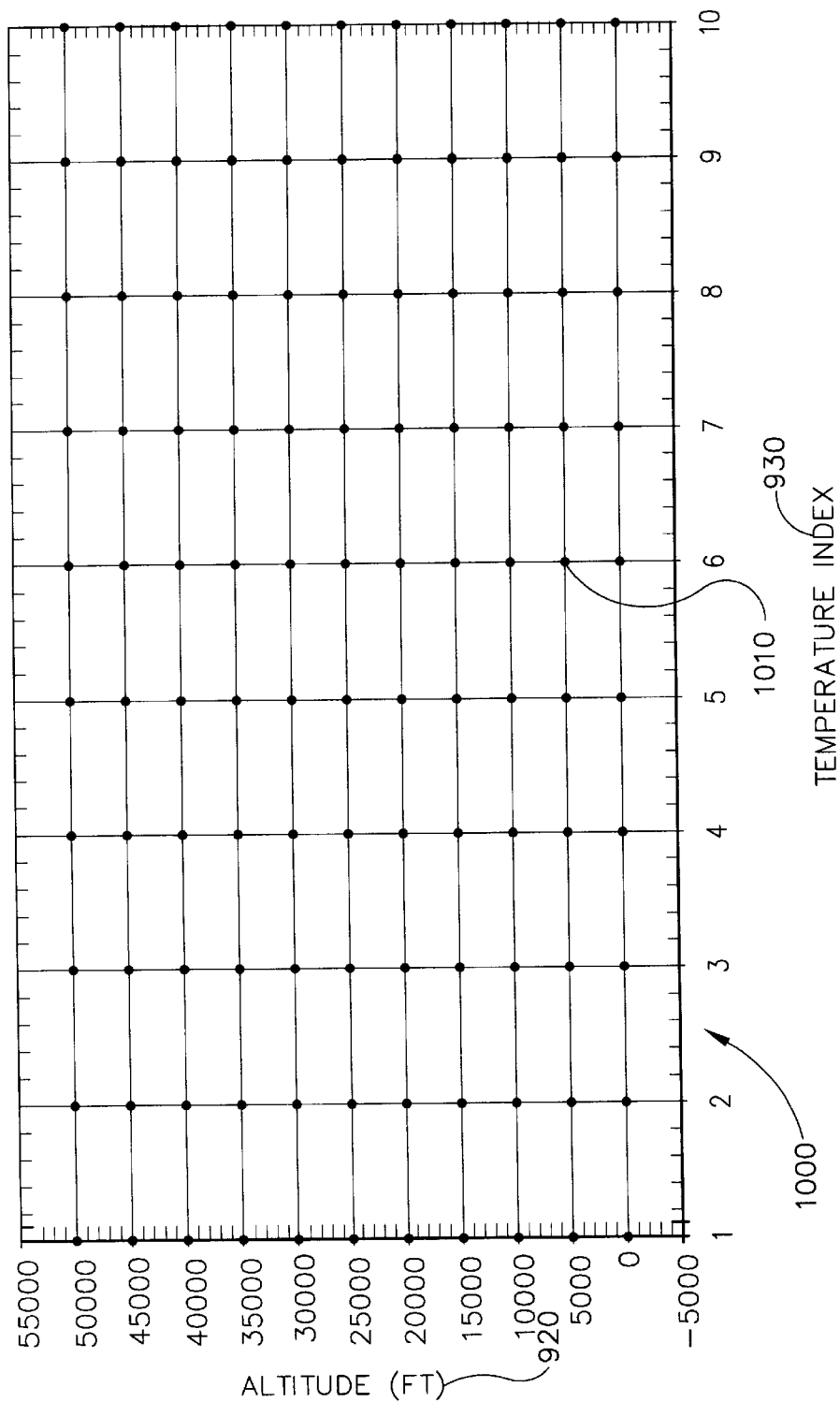
FIG. 10 is a graphical representation of a power setting parameter table in accordance with the present invention.

The power setting parameter table may be generated by process 700 using the flight speed and temperature indices 830 and 930. Using the temperature index 930 as the independent variable, FIG. 10 shows a power setting parameter table generally designated 1000 in accordance with the invention. Data points 1010 indicate power setting parameters corresponding to correlated altitude 920 and temperature index 930 values. Those skilled in the art will note that the power setting parameter table 1000 shows the data of FIG. 4 in the desired "square" form as shown in FIG. 2, but with nearly 50% less data points 1010.

Figure 11:
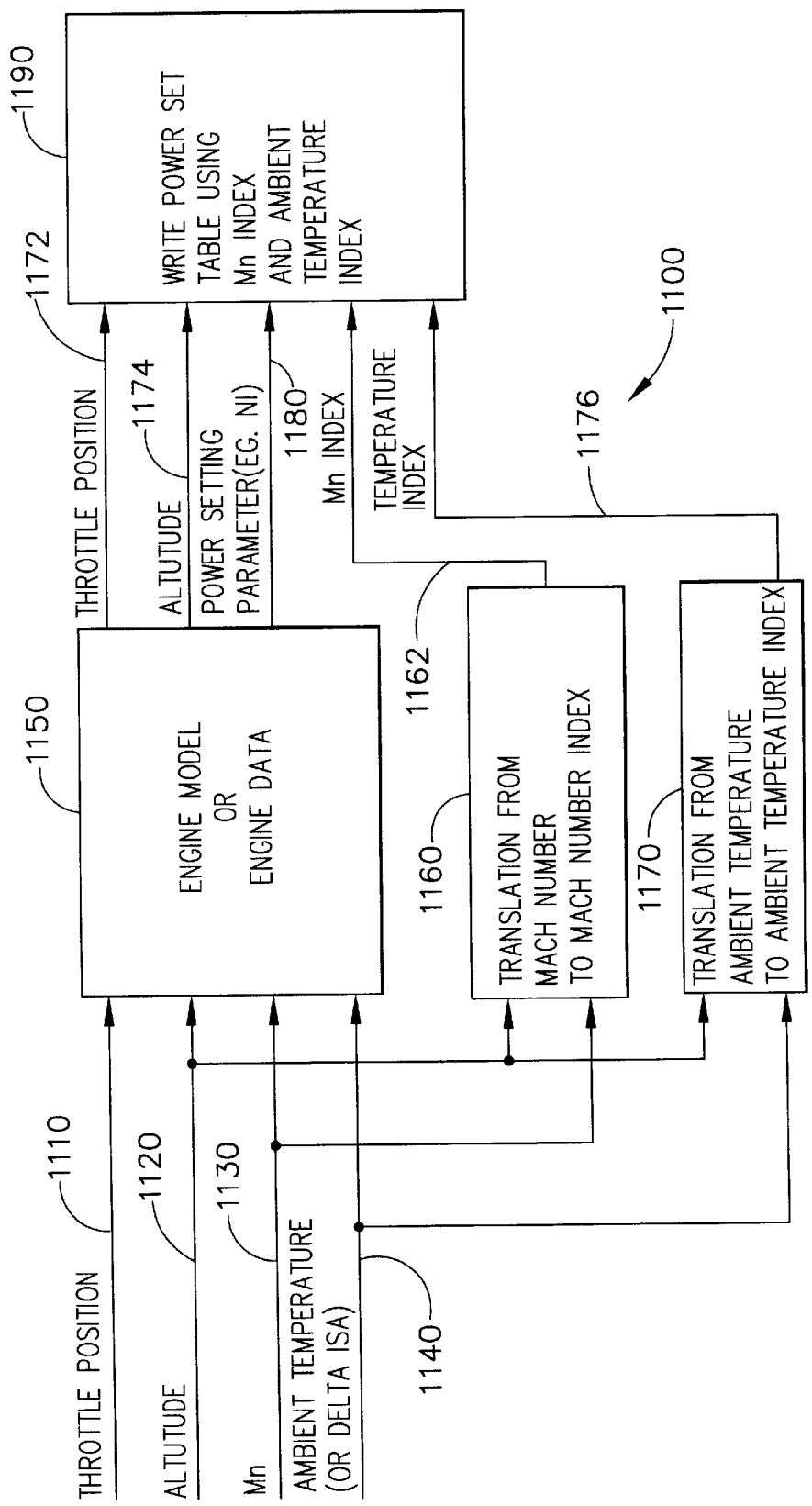
FIG. 11 is a schematic representation of an alternative embodiment of the present invention.

An alternative embodiment of the invention shown in FIG. 11 includes a process generally designated 1100 for generating a power setting parameter table. A throttle position 1110, an altitude 1120, a Mach number 1130 and an ambient temperature value 1140 may be input to an engine model process 1150 having as outputs a throttle position 1172, an altitude 1174 and a power setting parameter 1180. In a process 1160, a Mach number index 1162 may be generated as described herein from the altitude 1120 and the Mach number 1130. In a process 1170, a temperature index 1176 may be generated as described herein from the altitude 1120 and the ambient temperature value 1140.

A process 1190 writes the power setting parameters to the power setting parameter table using the throttle position 1172, the altitude 1174, the power setting parameter 1180, the Mach number index 1162 and the temperature index 1176.

The system and process of the invention advantageously allow for changes to the power setting parameter table without software recoding to account for changes to the operating envelope. Thus, engine control can be easily reconfigured for different applications of the same engine where the operating envelope assumes a different shape and/or size.

As can be appreciated by those skilled in the art, the method of the present invention generates a power setting parameter table. By generating the table using the generated indexes, the amount of data in the table is significantly reduced.

It should be understood, of course, that the foregoing relates to preferred embodiments of the invention and that modifications may be made without departing from the spirit and scope of the invention as set forth in the following claims.

We claim:

1. A method for generating a power setting parameter table, the method comprising the steps of:

generating an index from a plurality of first and second inputs, wherein each first input is at least one of a flight speed value and a temperature value, and each second input is at least one of an attitude value and a pressure value; and determining a power setting parameter corresponding to each index and second input.

2. The method of according to claim 1, wherein generating the index from the plurality of first and second inputs further comprises using a translation table.

3. A method for generating a power setting parameter, the method comprising the steps of:

generating a first index from a plurality of first and second inputs, wherein each first input is a flight speed value and each second input is at least one of an altitude value and a pressure value;

determining a first power setting parameter corresponding to each first and second input to form a power setting parameter table; and interrogating the power setting parameter table using the first index and the second input to generate the first power setting parameter.

4. A method for generating a power setting parameter, the method comprising the steps of:

generating a first index from a plurality of first and second inputs, wherein generating the first index from the plurality of first and second inputs further comprises using a first transition table;

determining a first power setting parameter corresponding to each first and second input to form a power setting parameter table; and interrogating the power setting parameter table using the first index and the second input to generate the first power setting parameter.

5. A method for generating a power setting parameter, the method comprising the steps of:

generating a first index from a plurality of first and second inputs;

determining a first power setting parameter corresponding to each first and second input to form a power setting parameter table; and interrogating the power setting parameter table with a throttle position value.

6. A method for generating a power setting parameter, the method comprising the steps of:

generating a first index from a plurality of first and second inputs;

determining a first power setting parameter corresponding to each first and second input to form a power setting parameter table; and interrogating the power setting parameter table using the first index and the second input to generate the first power setting parameter; and generating a second index from a plurality of third and second inputs, determining a second power setting parameter corresponding to each index and second input to form the power setting parameter table, and interrogating the power setting parameter table using the second index and the second input to generate the second power setting parameter.

7. The method of claim 6, wherein each third input is a temperature value and each second input is an altitude value.

8. The method of claim 6, wherein each third input is a temperature value and each second input is a pressure value.

9. The method of claim 6, wherein generating the second index from the plurality of third and second inputs further comprises using a second translation table.

10. A system for generating a power setting parameter table comprising:

a memory coupled to a processor, the processor operable to generate an index from a plurality of first and second inputs and determine a power setting parameter corresponding to each index and second input, wherein each first input is at least one of a flight speed value and a temperature value and each second input is at least one of an altitude value and a pressure value.

11. The system according to claim 10, wherein the processor is further operable to generate the index from the first and second inputs using a translation table.

12. A computer readable media for generating a power setting parameter table comprising:

a code segment for generating an index from a plurality of first and second inputs, wherein each first input is at least one of a flight speed value and a temperature value and each second input is at least one of an altitude value and a pressure value; and a code segment for determining a power setting parameter corresponding to each index and second input.

13. A computer readable media, according to claim 12, wherein the code segment for generating the index from the plurality of first and second inputs further comprises a code segment which uses a translation table.

* * * * *